(12) United States Patent
Zehring et al.

(10) Patent No.: US 12,167,717 B2
(45) Date of Patent: Dec. 17, 2024

(54) BIRDING ACCESSORIES

(71) Applicant: Holscher Products, Inc., Fowler, IN (US)

(72) Inventors: Steven B. Zehring, West Lafayette, IN (US); Joseph Holscher, Fowler, IN (US); John C. Holscher, Fowler, IN (US)

(73) Assignee: Holscher Products, Inc., Fowler, IN (US)

( * ) Notice: Subject to any disclaimer, the term of this patent is extended or adjusted under 35 U.S.C. 154(b) by 149 days.

(21) Appl. No.: 17/936,429

(22) Filed: Sep. 29, 2022

(65) Prior Publication Data
US 2023/0126441 A1    Apr. 27, 2023

Related U.S. Application Data

(60) Provisional application No. 63/263,037, filed on Oct. 26, 2021.

(51) Int. Cl.
*A01K 45/00*    (2006.01)
*F16M 11/24*    (2006.01)

(52) U.S. Cl.
CPC .......... *A01K 45/002* (2013.01); *F16M 11/24* (2013.01); *F16M 2200/08* (2013.01)

(58) Field of Classification Search
CPC .............................. F16M 11/00; A01K 45/002
See application file for complete search history.

(56) References Cited

U.S. PATENT DOCUMENTS 2,005,602 A * 5/1934 Thomson ............. A01K 45/002
3,231,229 A * 1/1966 Morella ................ E04H 13/003

* cited by examiner

*Primary Examiner* — Joshua J Michener
*Assistant Examiner* — Henry Hooper Mudd
(74) *Attorney, Agent, or Firm* — Maginot, Moore & Beck, LLP (57) ABSTRACT

A birding accessory assembly includes a birding accessory, such as a bird bath, a pole for supporting the bird bath on the ground or other surface, and a removably interlocking feature between the bottom face of the accessory and the top end of the pole. The interlocking interface can include a plurality of knobs projecting from the bottom face of the accessory and a cam plate mounted on the pole. The cam plate defines a like plurality of ramp segments to receive the knobs. With the knobs disposed within the ramp segments, the accessory is rotated so that the knobs advance toward a lower end of the ramp segments. A side opening at the end of each segment receives a boss projecting from each knob to snap or click into engagement. An array of magnets carried by the cam plate can magnetically engage a metal plate integrated into the bottom face of the accessory.

12 Claims, 7 Drawing Sheets

FIG. 14
Section B-B

FIG. 15 a
BIRDING ACCESSORIES

BACKGROUND

The present disclosure is for a pole system for use in supporting birding accessories, such as bird feeders, perches, houses and the like.

For quite some time, birding has been a very popular hobby. Many people find that watching birds is a pleasant, relaxing, and educational way to spend time and observe nature. Although some bird watching is performed in a nature preserve setting, such as at parks and forests, much bird watching also occurs in and around the homes and yards of the bird watchers. To help better attract birds to watch, many people erect various bird attracting devices such as bird houses, feeders and baths. Along with the bird houses, feeders and baths, mounting hardware must be employed in order to place the bird house or bird feeder at a desired location. This mounting hardware can be as simple as a rope or wire that ties the bird attracting device to the branch of a tree, or a plurality of nails that nail a bird house, feeder or bath to a tree or a wall. However, these rudimentary mounting systems are awkward to install and often lack durability.

There is a need for an assembly that can be easily assembled and that provides a stable support for a variety of birding accessories.

SUMMARY OF THE DISCLOSURE

In one aspect of the disclosure, a birding accessory assembly comprises an elongated post having a support structure at one end for supporting the post on the ground or other surface, and a birding accessory having a bottom face. A removably interlocking feature is provided between an opposite end of the elongated post and the bottom face of the birding accessory. In one embodiment, the interlocking feature includes a cam plate defining a plurality of arcuate ramp segments, each of the ramp segments including a radially inward side wall extending from an entrance end of the ramp segment to a locking end of the ramp segment, and a side opening defined in the side wall at the locking end. A like plurality of knobs are configured to be slidingly received within a corresponding ramp of the plurality of ramp segments, each knob including a radially inward extending boss configured to be received within the side opening in the corresponding ramp in a click fit or snap fit engagement, to hold the accessory on the cam plate. The interlocking feature provides easy engagement of the accessory to the pole by simply rotating the accessory with the knobs engaged within the ramp segments.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

Figure 1:
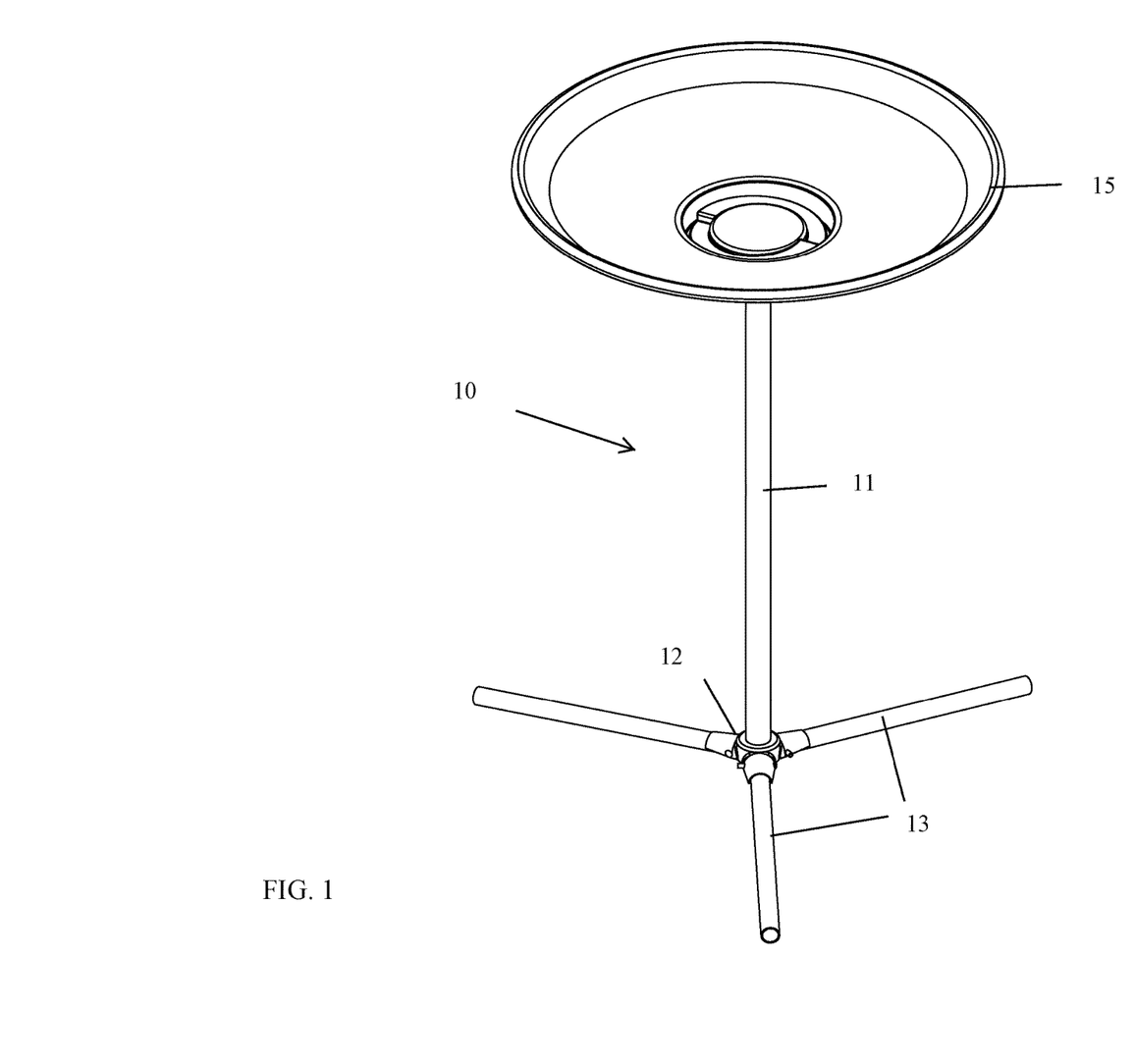
FIG. 1 is a perspective view of a bird bath assembly according to one embodiment of the present disclosure.
Figure 2:
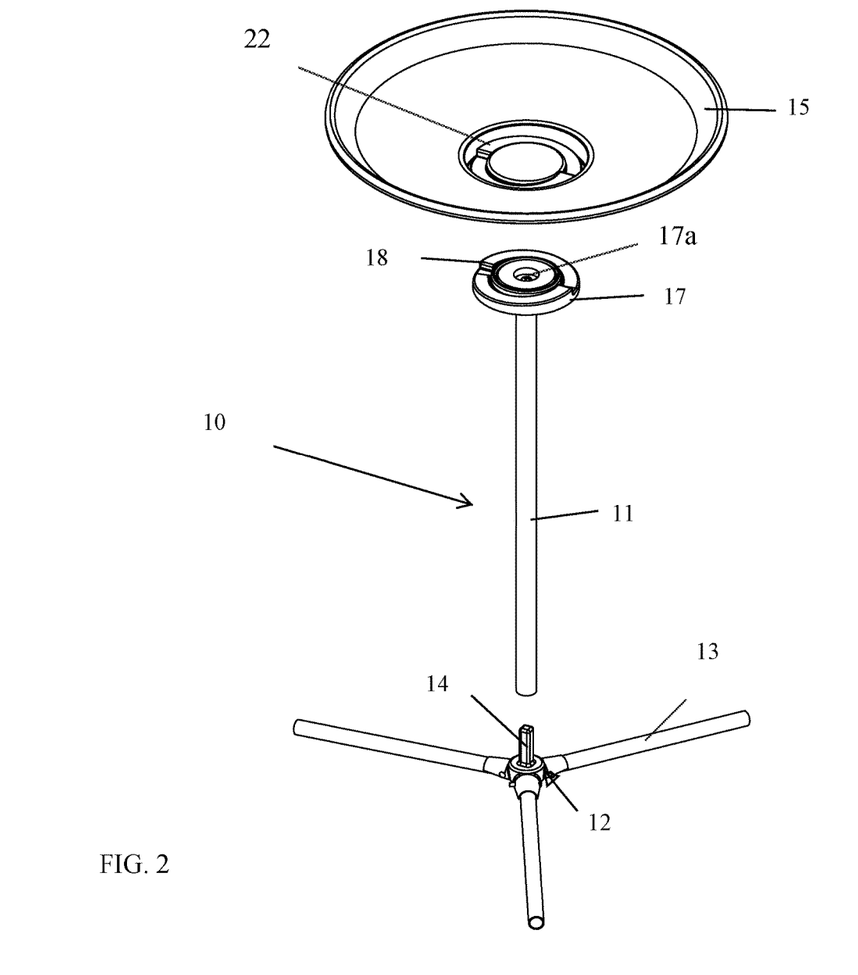
FIG. 2 is a partially exploded view of the bird bath assembly shown in FIG. 1.
Figure 3:
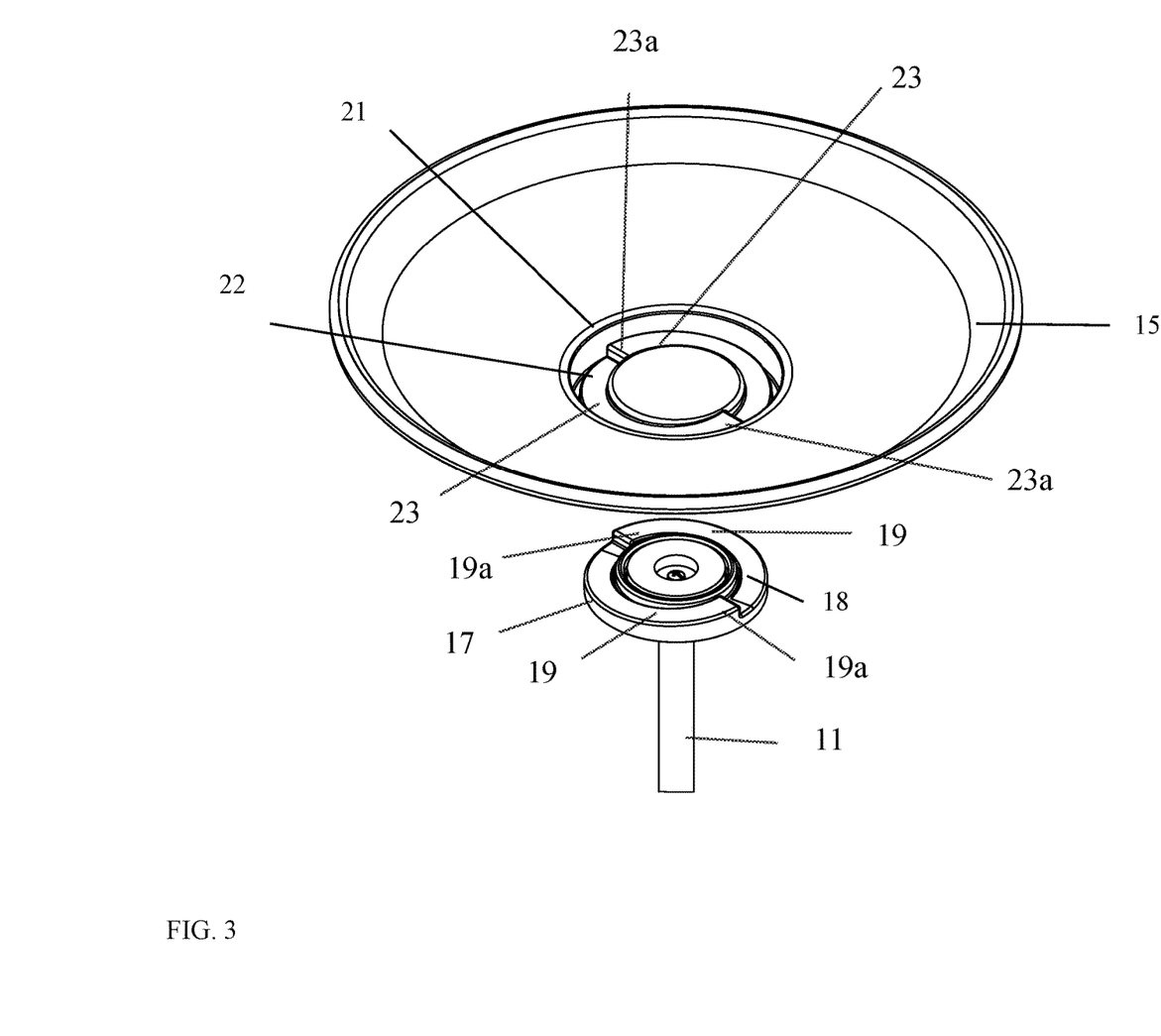
FIG. 3 is an enlarged partially exploded view of the bird bath assembly shown in FIG. 1.
Figure 4:
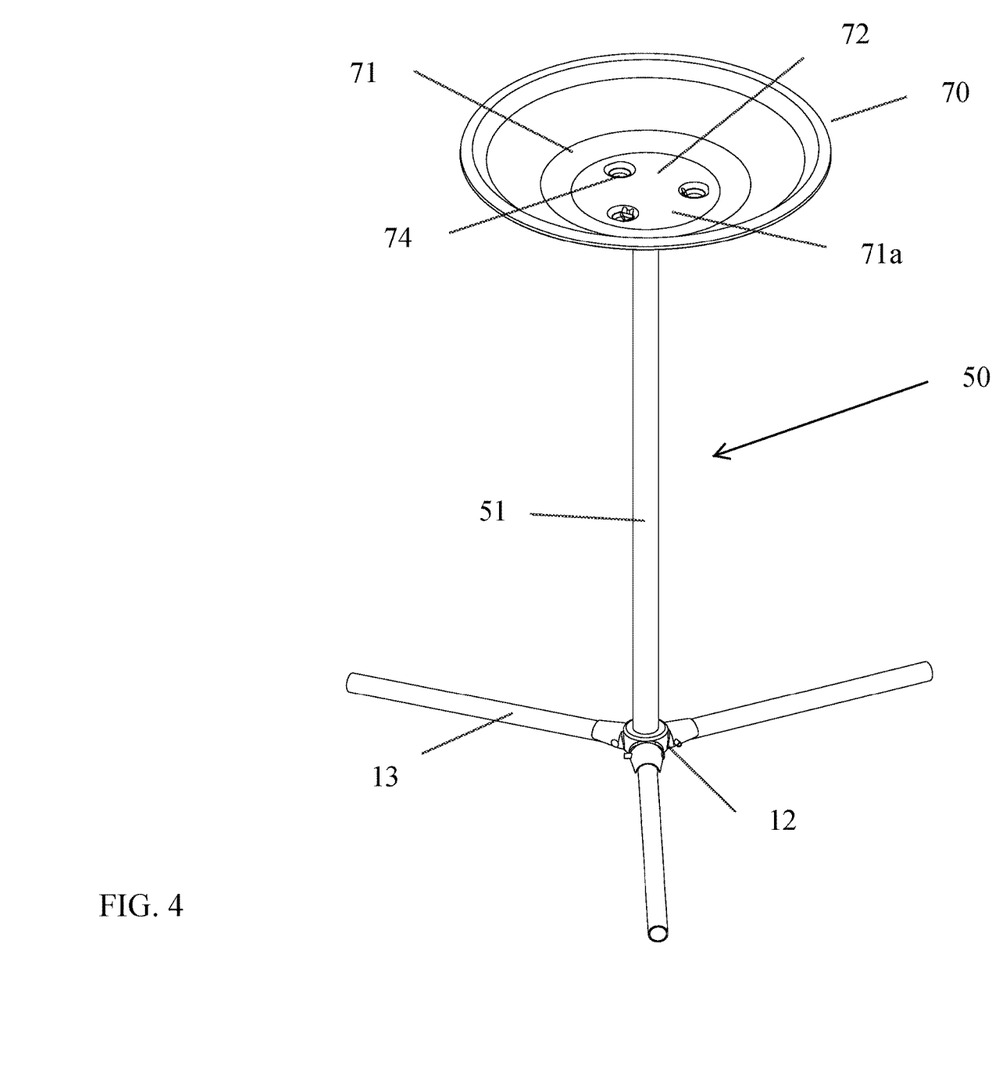
FIG. 4 is a perspective view of a bird bath assembly according to another embodiment of the present disclosure.
Figure 5:
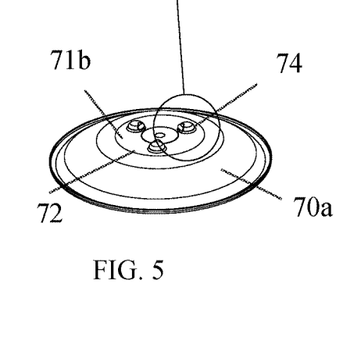
FIG. 5 is a bottom perspective view of the basin of the bird bath shown in FIG. 4.
Figure 6:
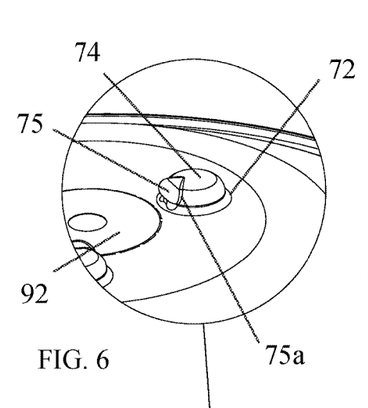
FIG. 6 is an enlarged view of the underside of the basin in FIG. 5.

One embodiment of a bird bath assembly 10 according to the present disclosure is shown in FIGS. 1-3. The assembly 10 is modular and easily disassembled and assembled. The assembly 10 includes a post 11 that is engaged to a base 12. In particular, the lower end of the post 11 defines a bore (not shown) that receives a spindle 14 projecting from the base (FIG. 2). The bore and spindle can be configured for complementary press-fit engagement. Thus, as shown in FIG. 2, the post can have a square cross-section for press-fit engagement within a bore having a square cross-section. The base 12 includes a support structure for supporting the post on the ground or other surface. In one embodiment, the support structure can be legs 13 that are removably engaged to the base in a known manner, such as by a push-button engagement feature. Alternatively, the support structure can include an auger configured to be screwed into the ground in lieu of the legs 13.

The bird bath 10 includes a basin 15 supported on the top end of the post 11. In particular, the post includes a mounting plate 17 with a removably interlocking mounting feature 18. The plate 17 can be fastened to the end of the post 11 by a screw 17a threaded into a mating bore (not shown) in the end of the post. The basin 15 includes a recess 21 that defines a mating interlocking feature 22. In one embodiment, the two interlocking features can be bayonet mount features (not shown) or a single-turn locking engagement as illustrated in FIG. 2. The mounting feature 18 includes a pair of 180° arcuate ramp segments 19 that are seated within mating 180° arcuate ramp recesses 23. The ramp segments and ramp recesses are configured for a press-fit engagement when the basin 15 is fully rotated on the mounting plate 17, with the ramp segments fully embedded within the corresponding ramp recesses. In one embodiment, each ramp recess narrows near the end 23a so that the mating end 19a of the ramp segments form a friction engagement. With this feature, the basin 15 can be easily and quickly fastened to and removed from the mounting plate 17. In another embodiment, the interlocking features 18, 22 can comprise a magnet system, with a magnet incorporated into the mounting plate 17 and a magnetic metal incorporated into the basin 15, or vice versa. It is contemplated that a variety of basins can be mounted to the post 11. It is also contemplated that other birding accessories can be provided in lieu of the basin, with the accessory incorporating the mating interlocking feature 22 for mounting on the interlocking feature 18 of the post 11. For instance, a bird house or feeder can be mounted on the post 11 using the interlocking features described herein.

Figure 7:
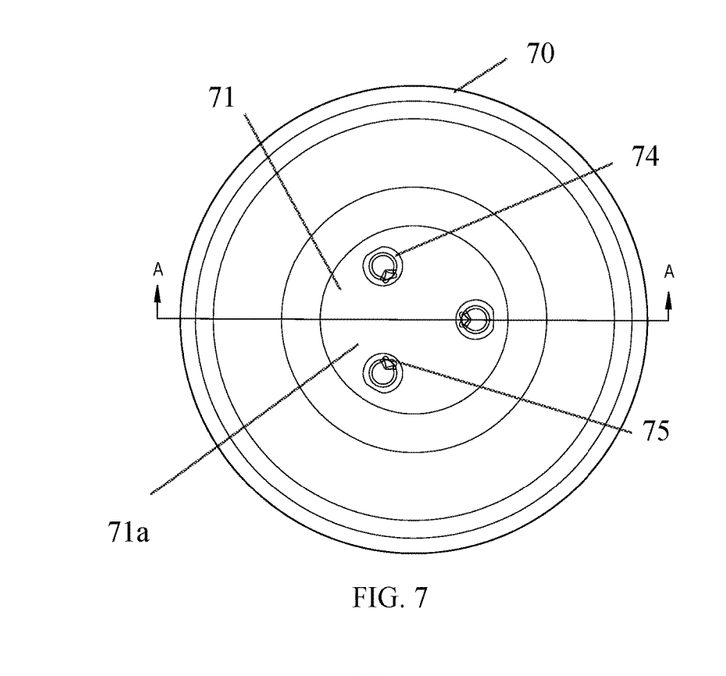
FIG. 7 is a top view of the basin of the bird bath shown in FIG. 4.
Figure 8:
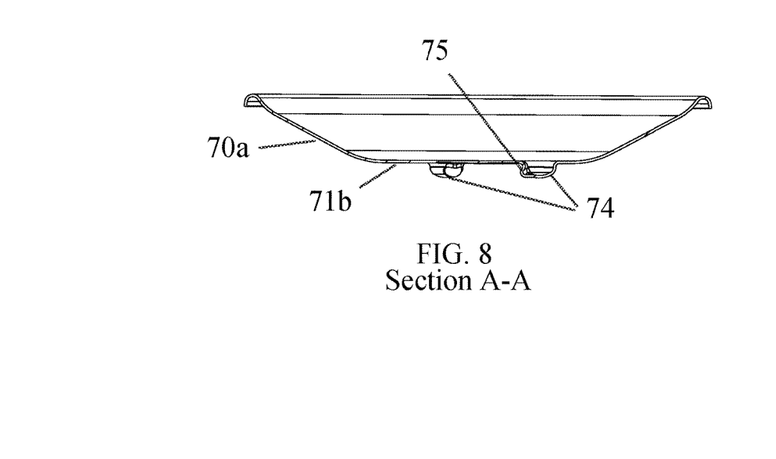
FIG. 8 is a cross-sectional view of the basin shown in FIG. 7, taken along line A-A.
Figure 9:
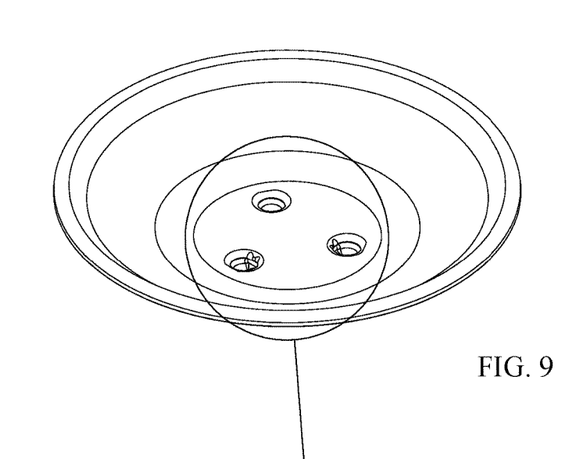
FIG. 9 is a top perspective view of the basin of the bird bath shown in FIG. 4.
Figure 10:
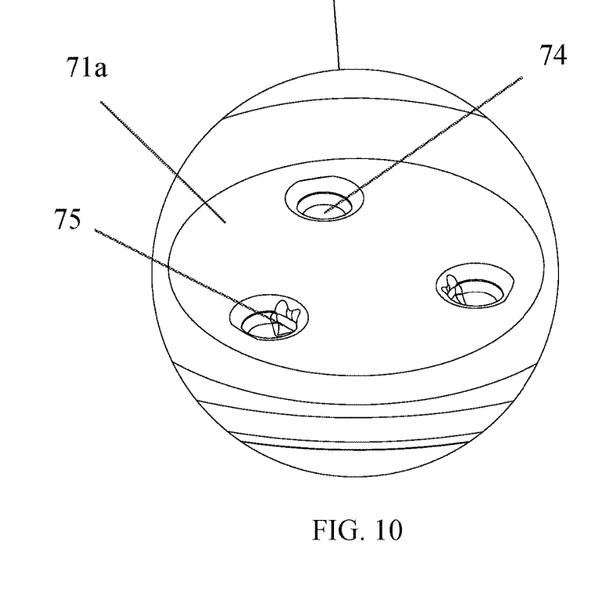
FIG. 10 is an enlarged view of the interlocking feature of the basin shown in FIG. 9.
Figures 11, 12:
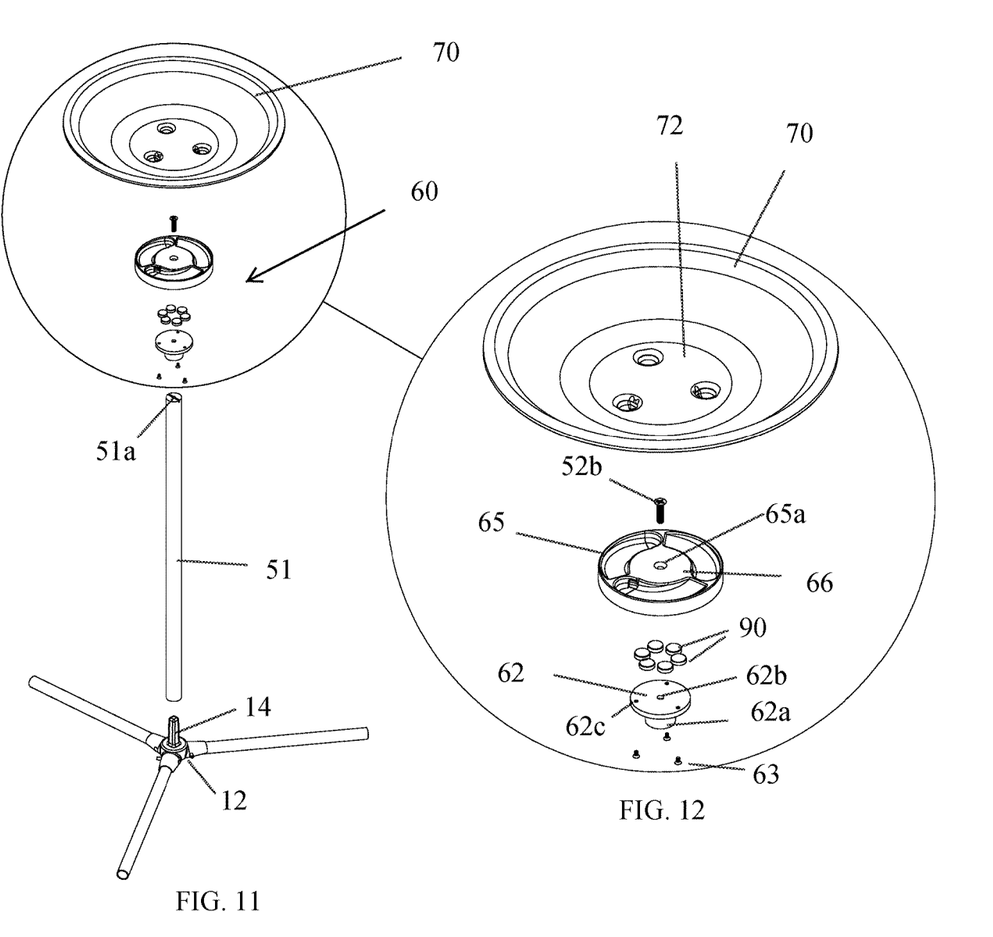
FIG. 11 is an exploded view of the bird bath shown in FIG. 4.
FIG. 12 is an enlarged exploded view of the basin and interlocking feature of the bird bath shown in FIG. 11.

Another embodiment of a bird bath assembly 50 is shown in FIGS. 4-15. Like the assembly 10, the assembly 50 is modular and easily assembled. The assembly 50 includes a post 51 that is similar to the post 11, with a similar base 12, spindle 14 and legs 13, as depicted in FIG. 11. As with the post 11, the base 12 can include a support structure other than the legs 13, such as an auger or other structure for supporting the post on the ground or other surface. The assembly 50 also includes a basin 71 that can be similar to the basin 15. The basin 70 includes a central recess 71 defined in the top face 71a of the basin that incorporates a mating removably interlocking feature 72. Details of the interlocking feature 72 are shown in FIGS. 5-10, which shows the bottom 70a of the basin 70 and the bottom face 71b of the recess 71. In particular, the interlocking feature includes a plurality of knobs 74 projecting from the bottom face 71b. As can be appreciated from FIG. 4, the knobs 74 can be indentations in the central recess 71, as best seen in FIG. 74, to facilitate fabrication of the basin 70 in an injection molding process. Each knob 74 includes a boss 75 that projects radially inwardly from the surface of the knob 74. In one embodiment, the knob 74 is in the form of a truncated sphere, and the boss 75 is teardrop shaped with a perimeter edge 75a. The boss is on the radially inwardly facing surface of the knob, as shown in FIG. 7. In the illustrated embodiment, the interlocking feature 72 includes three knobs 74 spaced evenly around the circumference of the recess 71.

The post 51 includes a mating interlocking feature 60 that is illustrated in FIGS. 11-15. The interlocking feature includes a mounting plate 62 that includes a collar 62a configured to fit over the end of the post 51. The plate defines a through bore 62b that is aligned with a threaded bore 51a in the end of the post 51. The interlocking feature further includes a cam plate 65 that defines a through bore 65a that is configured to receive a screw 52b that passes through the two through bores 62b, 65a for threaded engagement with the bore 51a in the post to fasten the interlocking feature 60 to the end of the post 51.

Figure 15:
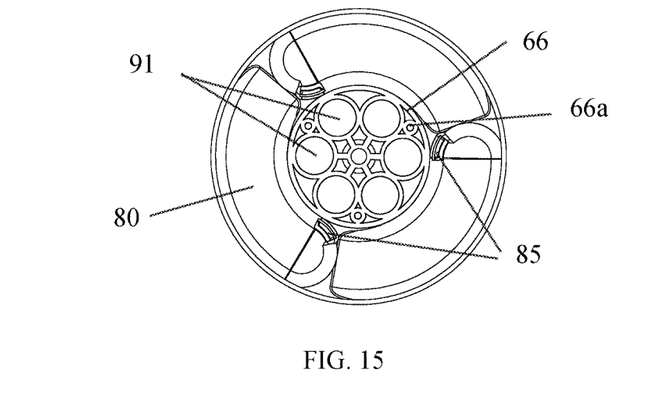
FIG. 15 is a bottom view of the cam plate of the interlocking feature shown in FIG. 12

The cam plate 65 includes a central hub 66 that includes the through bore 65a. As shown in FIG. 15, the underside of the hub 66 defines a plurality of threaded blind bores 66a that are aligned with through bores 62c defined in the mounting plate 62. The through bores 62c receive screws 63 (FIG. 12) that are threaded into the blind bores 66a of the cam plate 65 to fasten the cam plate to the mounting plate.

Figure 13:
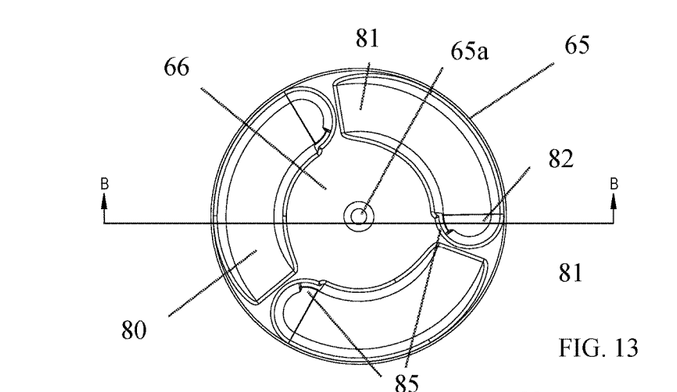
FIG. 13 is a top view of a cam plate of the interlocking feature shown in FIG. 12.
Figure 14:
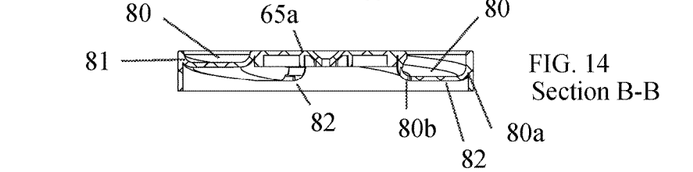
FIG. 14 is a cross-sectional view of the cam plate shown in FIG. 13, taken along line B-B.

The cam plate 65 includes a plurality of arcuate ramp segments 80 that slope downward from an entrance end 81 to a locking end 82. As shown in FIG. 13, the entrance end 81 of the ramp segments is adjacent the top face 65a of the cam plate and the locking end 82 is offset from the top face. The offset of the locking end is approximately equal to the height of the knob 74 from the bottom face 71b. In a specific embodiment, the offset and height are 0.25-0.50 inches. The ramp segments are defined at a constant radius from the center of the hub 66, so the knobs 74 are arranged at that radius on the bottom face 71b of the basin 70 to align with the ramp segments. The ramp segments 80 include arcuate side walls 80a, 80b that conform to the truncated spherical shape of the knobs 74 so that the knobs can easily slide along the ramp segments 80. The radially inner side wall 80b of each ramp segment defines a side opening 85 at the locking end 82 of the ramp segment. The side openings are configured to receive the boss 75 when the knobs are moved to the end of the ramp segment. The boss 75 and inner side wall 80b are configured to deflect slightly as the knob and boss move from the entrance end 81 to the locking end 82 of each ramp segment, until the boss reached the side opening 85 where it clicks into position within the opening.

It can be appreciated that the basin 70 can be mounted to the cam plate 65 by positioning the knobs 74 entrance end 81 of the arcuate ramp segments 80. In the illustrated embodiment, three knobs and ramp segments are provided, with the ramp segments subtending an angle of 120° to span one-third of the circumference of the cam plate. In an alternative embodiment, the three ramp segments can subtend an angle less than 120°, but preferably at least 90°. In other embodiments, more than three knobs and ramp segments can be provided. The basin is then rotated (in the clockwise direction in FIGS. 11 and 13) so that the knobs 74 travel along the downwardly sloping ramp segments, bringing the bottom face 71b of the basin into contact with the central hub 66 of the cam plate. The bosses 75 click into the side openings 85 to lock the basin onto the cam plate.

In an alternative embodiment, the interlocking feature can include a plurality of magnets 90 (FIG. 12) mounted within pockets 91 in the underside of the central hub 66 of the cam plate 65 (FIG. 15). The magnets can be discs that can be fixed within the pockets, such as by a press-fit, adhering, over-molding or other manner of fixation. Alternatively, or in addition, the magnets can be held within the pockets by the mounting plate 62 when the cam plate is fastened to the mounting plate as described above. The interlocking feature 72 of the basin 70 can include a magnetic metal plate 92 at the bottom face 71b (FIG. 6) that is aligned with the central hub 66 of the cam plate 65, which is, in turn, aligned with the pockets 91 in the underside of the cam plate. The magnets 90 provide additional security against dislodgement of the basin 70 from the cam plate 65 at the end of the post 51. In a specific embodiment, six magnets 90 and six pockets 91 are provided that are evenly circumferentially spaced around the central hub of the cam plate.

As with the bird bath assembly 10, the basin 70 of the bird bath assembly 50 can be replaced with another accessory to be supported on the post 51.

It can be appreciated that all of the components of the birding accessory assemblies 10, 50 can be provided in a kit for easy assembly by the purchaser. Thus, the post 11/51, legs 13 (if used), support plate 62, magnets 90 and cam plate 65 can be provided in a kit, with or without the basin 70. The basin, along with other birding accessories that incorporate the interlocking feature (i.e., the knobs) can be provided as a separate component to be added when the other components are assembled.

The present disclosure should be considered as illustrative and not restrictive in character. It is understood that only certain embodiments have been presented and that all changes, modifications and further applications that come within the spirit of the disclosure are desired to be protected. For instance, the interlocking feature 72 of the basin can instead be incorporated into the mounting plate 62 that is mounted to the end of the post 51. In this modification, the cam plate 65 is integrated into the bottom face 71b of the basin 70.

It can be appreciated that the components of the bird bath assemblies 10, 70 can be molded from a plastic or resin material. In certain embodiments, the magnets 90 and magnetic plate 92 can be overmolded within the respective basin and cam plate. In embodiments with the magnets, the mounting plate 62 can be formed of a magnetic metal to help retain the magnets within the interlocking feature.

What is claimed is:

1. A birding accessory assembly comprising:
an elongated post having a support structure at one end for supporting the post on the ground or other surface;
a birding accessory having a bottom face; and
a removably interlocking feature between an opposite end of the elongated post and the bottom face of said birding accessory, including;
   a cam plate including an upper face facing said birding accessory when the birding accessory is mounted thereon, said cam plate defining a plurality of arcuate ramp segments, each of said ramp segments including a radially inward side wall extending from an entrance end of the ramp segment to a locking end of the ramp segment and a side opening defined in said side wall at said locking end, wherein each of the ramp segments is angled downward from said entrance end to said locking end relative to said upper face; and
   a like plurality of knobs defined in the bottom face of said birding accessory and configured to be slidingly received within a corresponding ramp of the plurality of ramp segments, each knob including a radially inward extending boss configured to be received within said side opening in the corresponding ramp.

2. The birding accessory assembly of claim 1, wherein the removably interlocking feature includes three ramp segments and three knobs.

3. The birding accessory assembly of claim 2, wherein the three ramp segments each subtend an angle of 120 degrees.

4. The birding accessory assembly of claim 1, wherein:
said plurality of knobs are defined in said bottom face of said birding accessory; and
said cam plate is removably mounted to said opposite end of said elongated post.

5. The birding accessory assembly of claim 4, further comprising:
a mounting plate removably mountable to said opposite end of said elongated post;
a plurality of through bores defined in said mounting plate;
a like plurality of threaded bores defined in said cam plate; and
a like plurality of screws configured to extend through corresponding through bores in said mounting plate for threaded engagement with corresponding threaded bores in said cam plate.

6. The birding accessory assembly of claim 5, wherein:
the pole includes a threaded bore defined at said opposite end;
the mounting plate includes a central through bore;
said cam plate includes a central through bore; and
the assembly includes a screw configured to pass through the central through bores and engage the threaded bore to mount the cam plate and mounting plate to the pole.

7. The birding accessory assembly of claim 1, further comprising a base removably engageable to said post to support said post, said base having a support structure for supporting said post on the ground or other surface.

8. The birding accessory assembly of claim 7, wherein said support structure includes a plurality of legs extending from said base.

9. The birding accessory assembly of claim 7, wherein:
said base includes a spindle projecting therefrom; and
said post includes a complementary bore defined in said one end to receive said spindle in press-fit engagement.

10. A The birding accessory assembly comprising:
an elongated post having a support structure at one end for supporting the post on the ground or other surface;
a bird bath including a basin defining a bottom face; and
a removably interlocking feature between an opposite end of the elongated post and the bottom face of said birding accessory, including;
   a cam plate defining a plurality of arcuate ramp segments, each of said ramp segments including a radially inward side wall extending from an entrance end of the ramp segment to a locking end of the ramp segment and a side opening defined in said side wall at said locking end; and
   a like plurality of knobs defined in said bottom face and configured to be slidingly received within a corresponding ramp of the plurality of ramp segments, each knob including a radially inward extending boss configured to be received within said side opening in the corresponding ramp.

11. The birding accessory assembly of claim 10, wherein:
said basin defines a recess in a top face of said basin opposite said bottom face; and
said plurality of knobs are defined in said recess to project from said bottom face.

12. The birding accessory assembly of claim 10, wherein said basin and said cam plate are formed of a moldable plastic or resin.

* * * * *